(12) United States Patent
Lin

(10) Patent No.: US 8,141,827 B2
(45) Date of Patent: Mar. 27, 2012

(54) TRIPOD STRUCTURE OF STAND

(75) Inventor: Chien-Ting Lin, Santa Fe Springs, CA (US)

(73) Assignee: LINCO Inc., Santa Fe Springs, CA (US)

( * ) Notice: Subject to any disclaimer, the term of this patent is extended or adjusted under 35 U.S.C. 154(b) by 0 days.

(21) Appl. No.: 13/175,827

(22) Filed: Jul. 2, 2011

(65) Prior Publication Data

US 2012/0001038 A1  Jan. 5, 2012

(30) Foreign Application Priority Data

Jul. 2, 2010 (CN) ...................... 2010 2 0245799 U

(51) Int. Cl.
*F16M 11/38* (2006.01)
(52) U.S. Cl. ...................... 248/171; 248/170; 248/177.1
(58) Field of Classification Search .................. 248/171, 248/166, 169, 170, 440, 177.1
See application file for complete search history.

(56) References Cited

U.S. PATENT DOCUMENTS

| | | | | |
|---|---|---|---|---|
| 1,234,510 A | * | 7/1917 | Trautwein | 248/171 |
| 1,863,442 A | * | 6/1932 | Goodman et al. | 248/171 |
| 2,493,978 A | * | 1/1950 | Kromer | 248/171 |
| 4,223,860 A | * | 9/1980 | Prest | 248/171 |
| 5,934,628 A | * | 8/1999 | Bosnakovic | 248/177.1 |
| 5,964,524 A | * | 10/1999 | Qian | 362/414 |
| 2005/0051682 A1 | * | 3/2005 | Tuohy et al. | 248/176.1 |

* cited by examiner

*Primary Examiner* — Anita M King
(74) *Attorney, Agent, or Firm* — Lin & Associates IP, Inc.

(57) ABSTRACT

Provided is a tripod structure of a stand, which is combined on a central post of the stand and allows the leg units of the stand to be folded, and includes: an upper tripod unit having a central post orifice and at least three leg unit connection parts evenly arranged at the outer periphery of the central post and formed with at least an accessory part, wherein the upper tripod unit is fastened at a preset location of the central post of the stand via the central post orifice, and each leg unit of the stand is respectively hinged with each leg unit connection part; and a lower tripod unit having a post plug and at least three moveable support rod connection parts evenly arranged at the outer periphery of the post plug, and each moveable support rod connection part is correspondingly formed with a leg unit buckling part and formed with at least an accessory part, wherein the post plug is installed at the distal end of the central post of the stand, and hinged to the leg unit and the moveable support rod connection part through a support rod, such that the leg units can be folded and respectively buckled with each corresponding leg unit buckling part.

9 Claims, 7 Drawing Sheets

US 8,141,827 B2

TRIPOD STRUCTURE OF STAND

BACKGROUND OF THE INVENTION

1. Field of the Invention

The present invention relates to an improved support structure, especially to an improved tripod structure of a stand.

2. The Prior Arts

In the fields of photographing, image capturing or music, various types of stands are used. The structural design of the support between the stand and the ground plays a very important role when the stand is in use. Factors such as the balance and endurance of the applied force, convenience of storage and transportation shall be considered. And one of the major considerations is related to the moveable folding of leg units of the stand. The structure relative to the central post and the leg units of the stand is the so-called tripod structure. For example, the Y-shaped tripod structure is the most commonly seen tripod structure, the characteristic is that it has the simple and rigid Y-shaped structure, wherein the basic structure thereof is outwardly extending three rectangular structures from the center of a circle, and the interval between adjacent rectangular structures is 120 degree which is how the Y-shaped is formed. The conventional tripod structure is very easy in assembly but the shortage is having a bulky volume, and the leg units cannot be closely folded. Moreover, the feature of an I-shaped top/down tripod is that it has an I-shaped appearance, and the design concept is the three leg units and the central post are arranged in an I-shape while being folded, such that a conventional 3D Y-shaped stand is successfully transformed to a planar I-shape. The advantage of the I-shaped stand is that it can be folded to a planar shape during the transportation for greatly reducing the transportation cost, but the disadvantage is that the stressed points are scattered thereby the force or stress which the stand is able to sustain is limited.

SUMMARY OF THE INVENTION

The problems to be solved by the present invention are: the conventional Y-shaped tripod structure has a bulky volume and the leg units cannot be closely folded, and the stressed points of the I-shaped tripod structure are scattered so the force or stress which the leg units can sustain is limited, thereby the conventional arts is not able to enjoy both advantages of structural design and convenience in use.

A primary objective of the present invention is to provide an improved tripod structure of a stand which can enjoy both advantages of structural design and convenience in use.

For solving the mentioned problems of the conventional arts, the present invention provides a tripod structure of a stand, which is combined on a central post of a stand and allows leg units of the stand to be folded, comprises: an upper tripod unit having a central post orifice and at least three leg unit connection parts evenly arranged at the outer periphery of the central post and formed with at least an accessory part, wherein the upper tripod unit is fastened at a preset location of the central post of the stand via the central post orifice, and each leg unit of the stand is respectively hinged with each leg unit connection part; a lower tripod unit having a post plug and at least three moveable support rod connection parts evenly arranged at the outer periphery of the post plug, and each moveable support rod connection part is correspondingly formed with a leg unit buckling part and formed with at least an accessory part, wherein the post plug is installed at the distal end of the central post of the stand, and hinged to the leg unit and the moveable support rod connection part through a support rod, such that the leg units can be folded and respectively buckled with each corresponding leg unit buckling part.

The advantage of the present invention is to improve the shortage of not being able to sustain the larger force or stress while the advantage of the conventional tripod structure of the stand being kept. And the present invention has successfully reduced the volume of the stand. Meanwhile, with the design of the accessory hole and accessory hook, other accessories or counterweight devices can be adopted; thereby the operation of the stand is more flexible.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
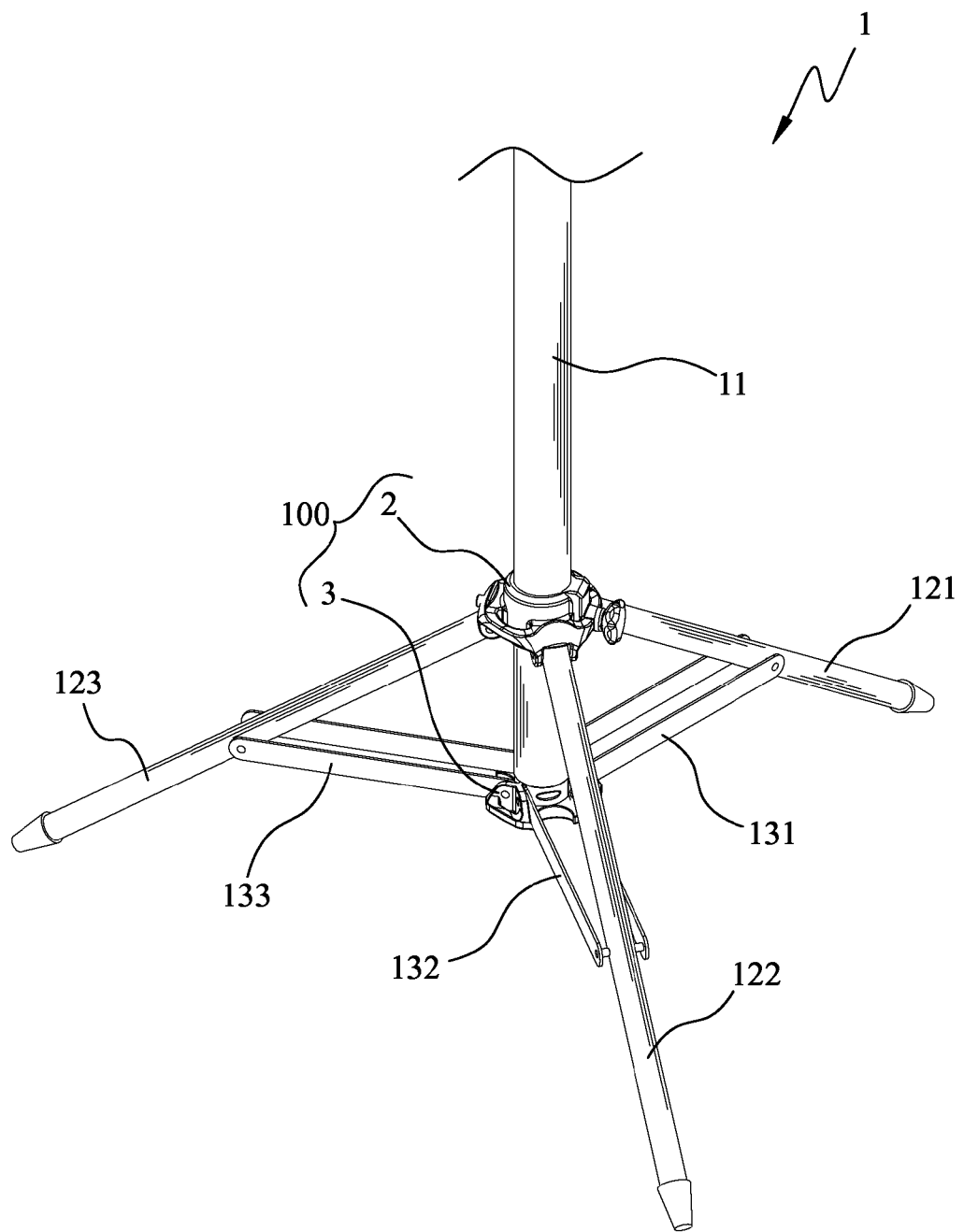
FIG. 1 is a perspective view showing a tripod structure of a stand according to the present invention being assembled with the stand.

Please refer to FIG. 1, which is a perspective view of a tripod structure of a stand according to the present invention being assembled with a stand. The tripod structure 100 of the stand mainly consists of an upper tripod unit 2, and a lower tripod unit 3. The upper tripod unit 2 is installed at a preset location on a central post 11 of the stand 1, and hinged with leg units 121, 122, 123. The upper tripod unit 2 is installed at a distal end of the central post 11, and moveable support rods 131, 132, 133 are respectively hinged with the leg units 121, 122, 123 and the lower tripod unit 2, such that the leg units 121, 122, 123 can be moveably unfolded or folded.

Figure 2:
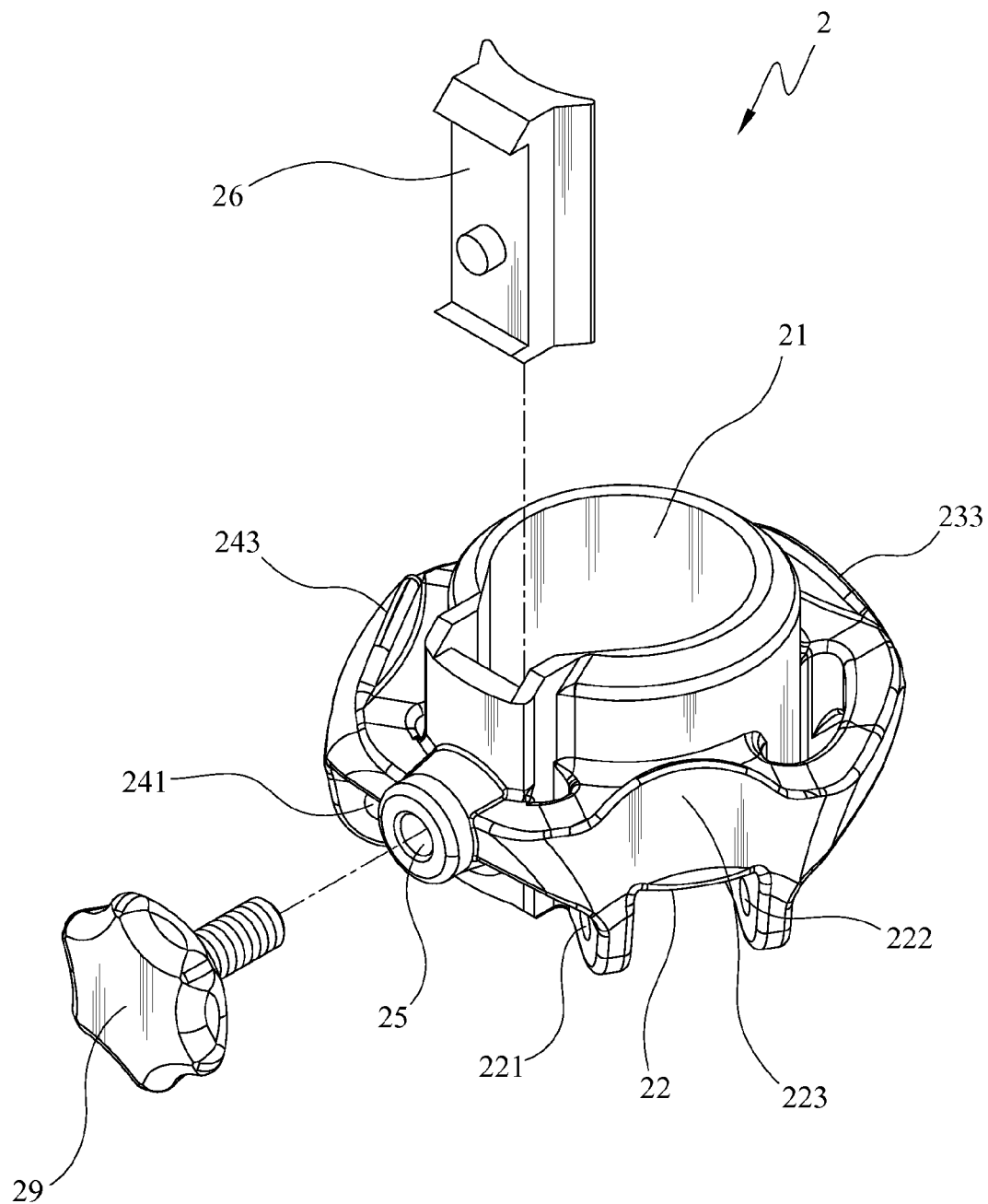
FIG. 2 and FIG. 3 are perspective views showing the upper tripod unit taken from different viewing angles, according to one embodiment of the present invention.
Figure 3:
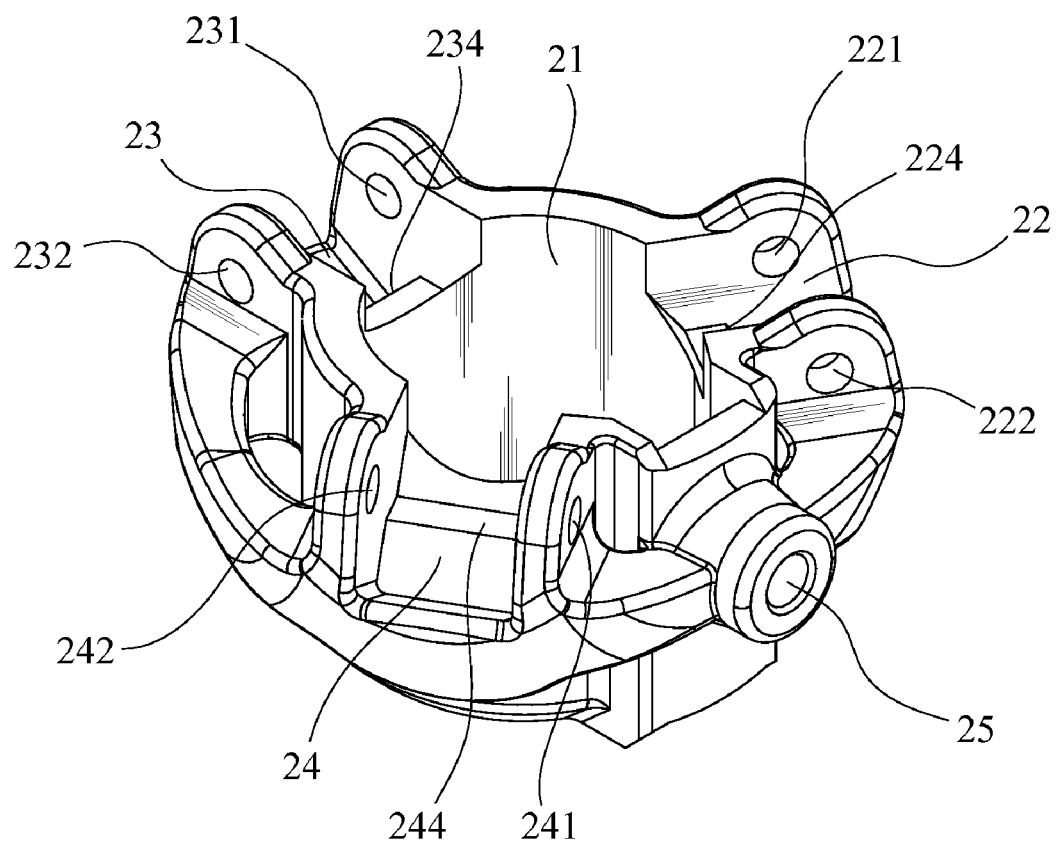

Please refer to FIG. 2 and FIG. 3, which are perspective views showing the upper tripod unit taken from different viewing angles. As shown in figures, the upper tripod unit 2 has a central post orifice 21 and three leg unit connection parts 22, 23, 24, and is fastened at a preset location on the central post 11 of the stand 1 via the central post orifice 21.

In this embodiment of the present invention, the leg unit connection parts 22, 23, 24 of the upper tripod unit 2 are fasten seats evenly arranged at the periphery of the central post orifice 21. The leg unit connection part 22 has a pair of screw holes 221, 222 at the corresponding locations, the leg unit connection part 23 has a pair of screw holes 231, 232 at the corresponding locations, and the leg unit connection part 24 has a pair of screw holes 241, 242 at the corresponding locations, the primary function thereof are to fasten the leg units 121, 122, 123 with fasten units (not shown in figures) so as to be hinged with the leg unit connection parts 22, 23, 24. The leg unit connection parts 22, 23, 24 of the upper tripod unit 2 respectively have a concave part, 224, 234, 244, so when the leg units are unfolded, the distal ends thereof are abutted against the concave parts 224, 234, 244 for restraining the rotation angles of the leg units 121, 122, 123.

Figure 4:
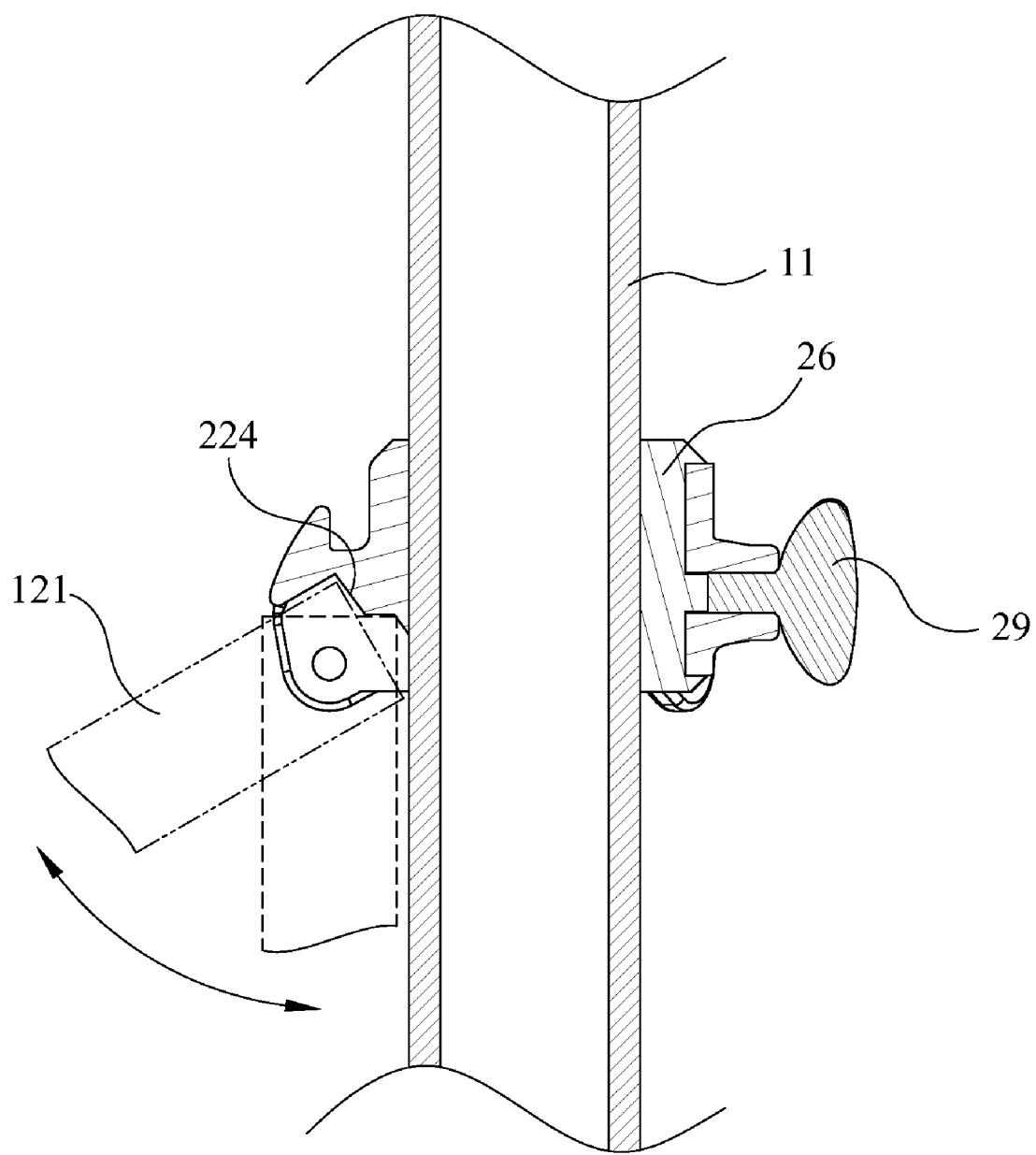
FIG. 4 is a cross sectional view showing the upper tripod unit being assembled with the central post, according to one embodiment of the present invention.

Please refer to FIG. 4, one side of the upper tripod unit 2 has a fasten screw hole 25 in which an inner fasten member 26 is installed, and is correspondingly disposed between the central post orifice 21 and the central post 11 of the upper tripod unit 11, so after a fasten unit 29 being screwed in, the central post 11 is pressed through the inner fasten member 26. Moreover, the hinged leg unit 121 can be freely unfolded or folded, when being unfolded to a preset angle, for example 60 degree; through the means of the distal end of the leg unit 121 being abutted against the concave part 224, the leg unit 121 can be restrained from being overly unfolded which may cause deformation, and capable of sustaining a part of the support force while the leg unit being unfolded, so the hinged part is prevented from being subject to the whole support force (as shown in FIG. 4).

Moreover, the upper tripod unit 2 is formed with at least an accessory part, i.e. an accessory hole 27, 28 is respectively formed between the leg unit connection parts 22, 23 and between the leg unit connection parts 23, 24; and the leg unit connection parts 22, 23, 24 are respectively formed with an accessory hook 223, 233, 243. The accessory holes 27, 28 are provided for being used by the stand carrying belt or other accessories, and the three accessory hooks 223, 233, 243 are provided for hanging counterweight devices and accessories, for example sand bags, so the hooked devices or accessories can be prevented from falling off from the inclined leg units. In this embodiment of the present invention, the accessory pats of the upper tripod unit are illustrated through adopting the accessory holes and the accessory hooks, the present invention is not limited by the adopted components, other structures having substantially the same functions can also be adopted, as long as the structure has the capability of being installed with accessories such as counterweight devices.

Figure 5:
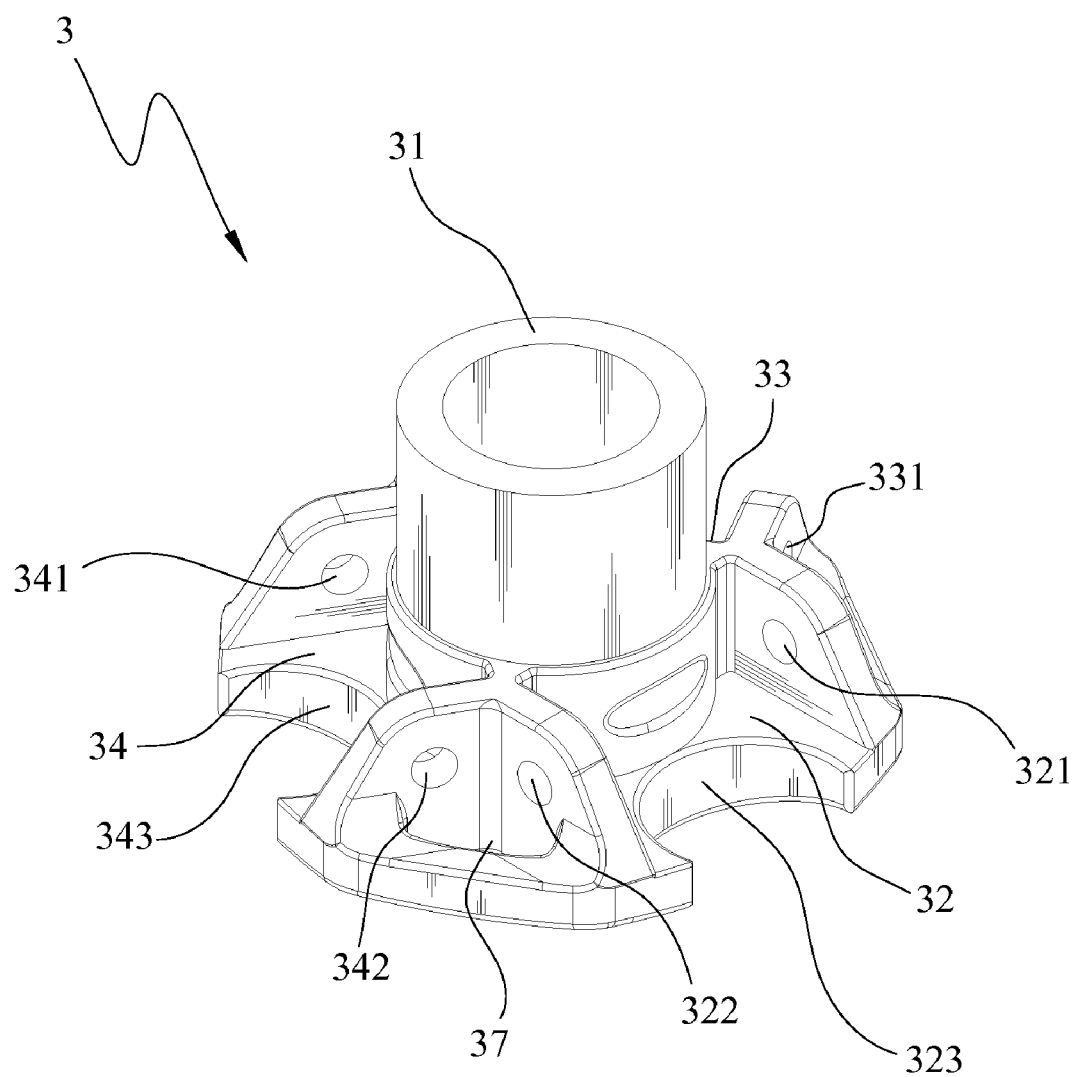
FIG. 5 and FIG. 6 are perspective views showing the lower tripod unit taken from different viewing angles, according to one embodiment of the present invention.
Figure 6:
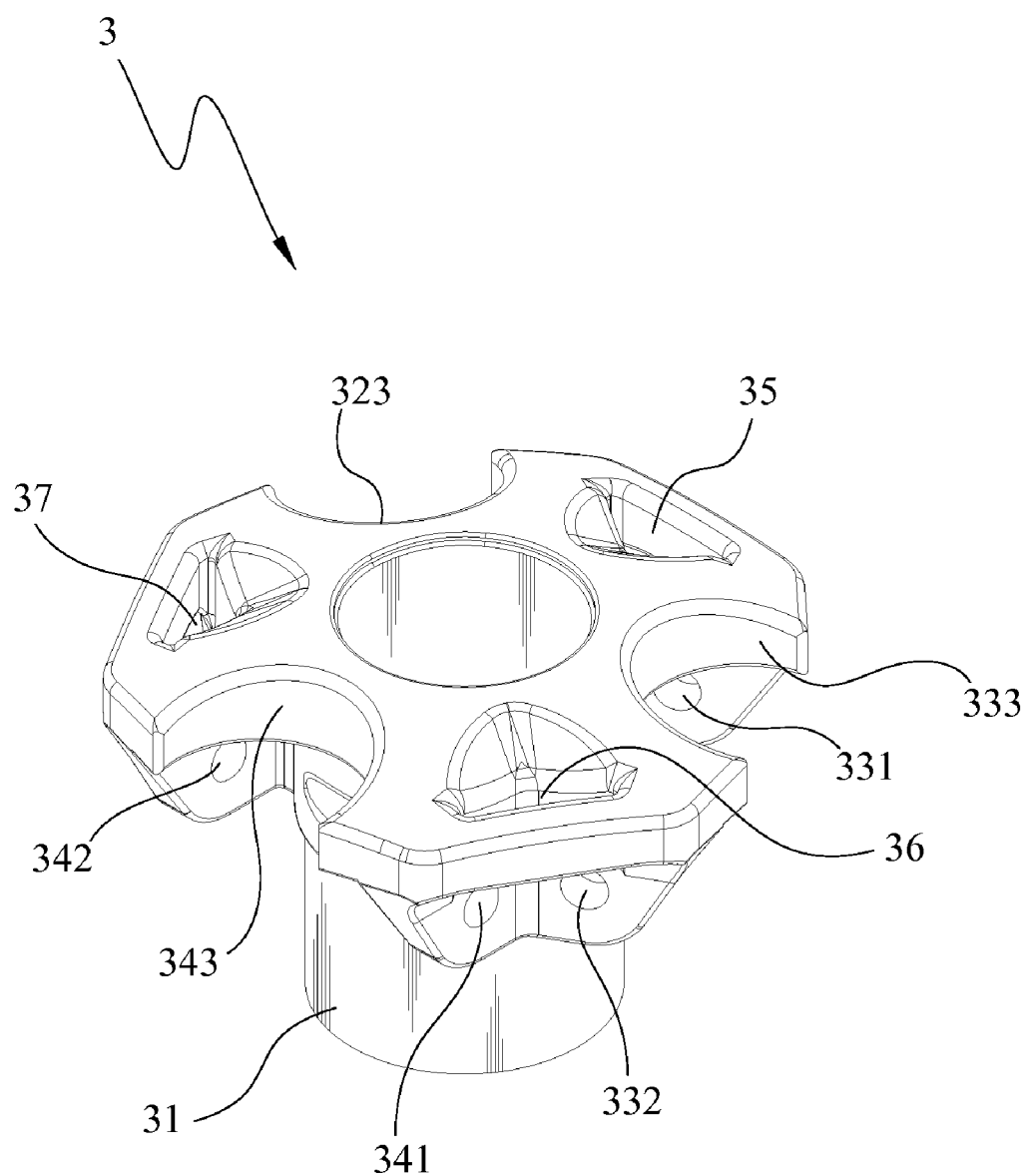

Please refer to FIG. 5 and FIG. 6, which are perspective views showing the lower tripod unit taken from different viewing angles. As shown in figures, the lower tripod unit 3 has a post plug 31 and three moveable support rod connection parts 32, 33, 34, wherein the post plug 31 is installed at the distal end of the central post 11 of the stand 1.

In this embodiment of the present invention, the moveable support rod connection parts 32, 33, 34 of the lower tripod unit 3 are fasten seats evenly arranged at the outer periphery of the post plug 31, and each moveable support rod connection part 32, 33, 34 is correspondingly formed with a leg unit buckling part 323, 333, 343. The moveable support rod connection part 32 has a pair of screw holes 321, 322 at the corresponding locations, the moveable support rod connection part 33 has a pair of screw holes 331, 332 at the corresponding locations, and the moveable support rod connection part 34 has a pair of screw holes 341, 342 at the corresponding locations, the primary functions thereof are to hinge one end of the moveable support rods 131, 132, 133 to the moveable support rod connection parts 32, 33, 34 via fasten members (not shown), and to hinge the other end thereof to the leg units 121, 122, 123, such that the leg units 121, 122, 123 can be freely unfolded or folded, and respectively buckled to each corresponding leg unit buckling part 323, 333, 343 so situations of being easily loosened or tilted are avoided.

Similar to the upper tripod unit 2, the lower tripod unit 3 has at least an accessory part, i.e. an accessory hole 35, 36, 37 is respectively formed between the moveable support rod connection part 32, 33, 34 for being used by the stand carrying belt or other accessories. In this embodiment of the present invention, the accessory pats of the lower tripod unit are illustrated through adopting the accessory holes, the present invention is not limited by the adopted components, other structures having substantially the same functions can also be adopted, as long as the structure has the capability of being installed with accessories such as counterweight devices.

Figure 7:
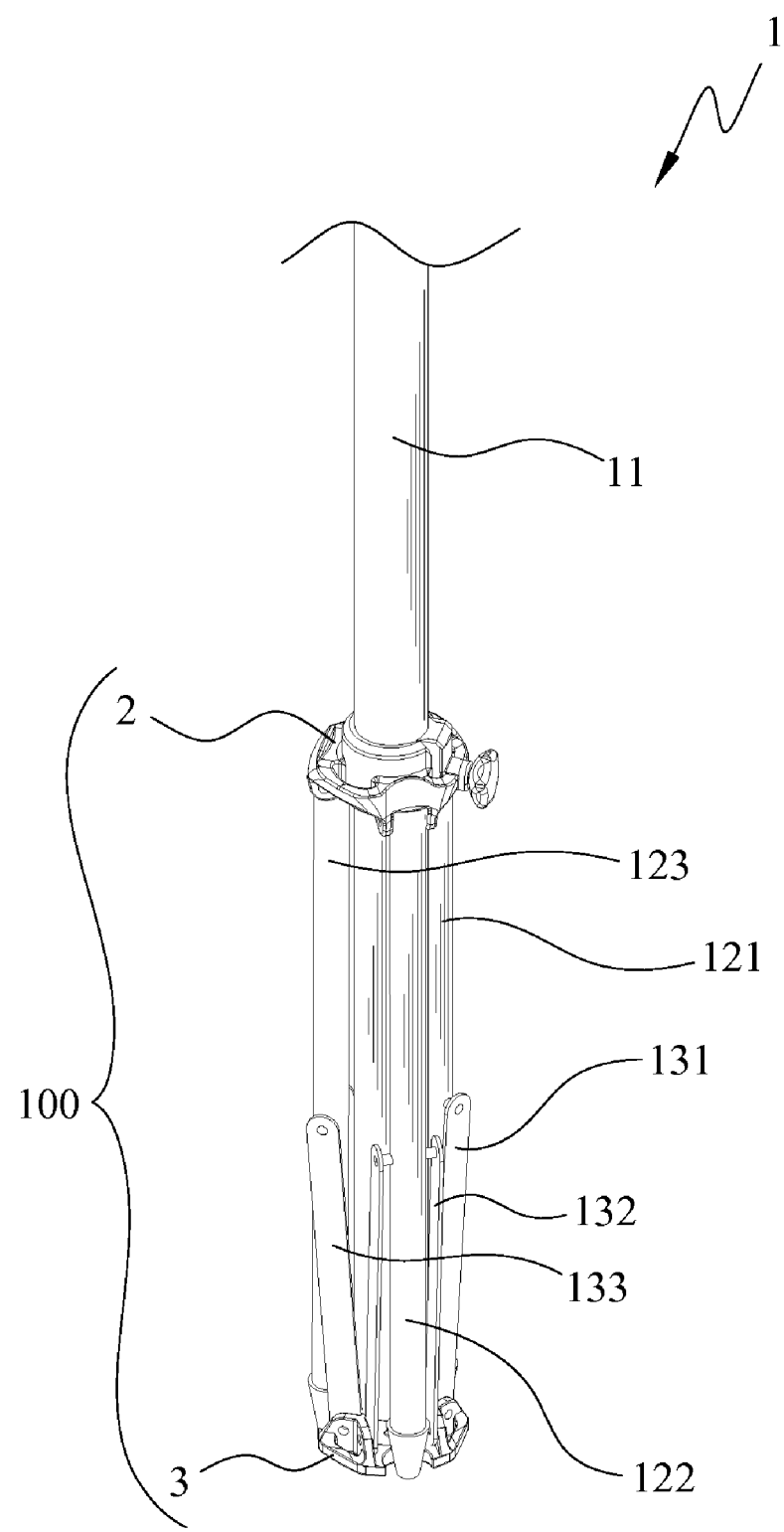
FIG. 7 is a schematic view showing the leg units of the stand being in a folded state, according to one embodiment of the present invention.

Please refer to FIG. 7, which is a schematic view showing the leg units of the stand being in a folded state. With the design of the tripod structure of the stand 100 provided by the present invention, the stand 1 is provided with an advantage of the three leg units being stressed at the same point while being unfolded. When the stand is desired to be folded, the upper tripod unit 2 is firstly loosened to a moveable state, then the leg units 121, 122, 123 are folded to the leg unit buckling parts 323, 333, 343, of the lower tripod unit 3, thereby the volume is greatly reduced while being folded, and more convenient in use.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A tripod structure of a stand, combined on a central post of the stand and allowing leg units of the stand to be folded, comprising:

an upper tripod unit having a central post orifice and at least three leg unit connection parts evenly arranged at the outer periphery of the central post orifice and formed with at least an accessory part, wherein the upper tripod unit is fastened at a preset location of the central post of the stand via the central post orifice, and each leg unit of the stand is respectively hinged with each leg unit connection part; and a lower tripod unit having a post plug and at least three moveable support rod connection parts evenly arranged at the outer periphery of the post plug, and each moveable support rod connection part is correspondingly formed with a leg unit buckling part and formed with at least an accessory part, wherein the post plug is installed at the distal end of the central post of the stand, and hinged to the leg unit and the moveable support rod connection part through one of the support rods, such that the leg units are enabled to be moveably folded and respectively buckled with each corresponding leg unit buckling part.

2. The tripod structure according to claim 1, wherein the leg unit connection part of the upper tripod unit is a fasten seat, and the fasten seat is installed with a pair of screw holes at the corresponding locations, so the leg unit is able to be fastened and hinged with the leg unit connection part through a fasten unit.

3. The tripod structure according to claim 1, wherein the moveable support rod connection part of the lower tripod unit is a fasten seat, and the fasten seat is installed with a pair of screw holes at the corresponding locations, so the moveable support rod is able to be fastened and hinged with the moveable support rod connection part through a fasten unit.

4. The tripod structure according to claim 1, wherein the accessory part of the upper tripod unit is an accessory hook.

5. The tripod structure according to claim 1, wherein the accessory part of the upper tripod unit is an accessory hole.

6. The tripod structure according to claim 1, wherein the accessory part of the lower tripod unit is an accessory hole.

7. The tripod structure according to claim 1, wherein one side of the upper tripod unit is further formed with a fasten screw hole, a fasten unit is installed therein for being clamped and fastened at a preset position of the central post.

8. The tripod structure according to claim 7, wherein the upper tripod unit further includes an inner fasten member installed correspondingly between the central post orifice and the central post of the upper tripod unit, so after the fasten unit is screwed in, the central post is pressed and fastened through the inner fasten member.

9. The tripod structure according to claim 1, wherein the leg unit connection part of the upper tripod unit is further formed with a concave part, so when the leg unit is unfolded, the distal end thereof is abutted against the concave part for restraining the rotation angle of the leg unit.

* * * * *